(12) United States Patent
Jia et al.

(10) Patent No.: US 12,147,943 B1
(45) Date of Patent: Nov. 19, 2024

(54) INDEXING METHOD AND SYSTEM FOR TRACKING RECORD OF COMPOSITE MATERIAL PRODUCTION PROCESS AND QUALITY MONITORING

(71) Applicant: WEIHAI GUANGWEI PRECISE MACHINERY CO., LTD., Weihai (CN)

(72) Inventors: Zhao Jia, Weihai (CN); Wenyi Wang, Weihai (CN); Huanbin Hou, Weihai (CN); Haichao Huang, Weihai (CN); Yuanhu Jiang, Weihai (CN)

(73) Assignee: WEIHAI GUANGWEI PRECISE MACHINERY CO., LTD., Weihai (CN)

(*) Notice: Subject to any disclaimer, the term of this patent is extended or adjusted under 35 U.S.C. 154(b) by 0 days.

(21) Appl. No.: 18/664,657

(22) Filed: May 15, 2024

(30) Foreign Application Priority Data

Jun. 25, 2023 (CN) .......................... 202310753222.X

(51) Int. Cl.
  *G06Q 50/04* (2012.01)
  *B32B 27/12* (2006.01)
  *G06Q 10/087* (2023.01)

(52) U.S. Cl.
  CPC .......... *G06Q 10/087* (2013.01); *G06Q 50/04* (2013.01)

(58) Field of Classification Search
  CPC .......................... G06Q 10/087; G06Q 50/04
  See application file for complete search history.

(56) References Cited

FOREIGN PATENT DOCUMENTS

| CN | 109102310 A | * | 12/2018 | ............. B29C 70/30 |
| CN | 109634242 A | | 4/2019 | |
| CN | 111331881 A | * | 6/2020 | ............. B29B 11/12 |

(Continued)

OTHER PUBLICATIONS

Song Cheng-Xuan et al., Research on Elevator Component Traceability System Based on Two-dimension Code & RFID, Modular Machine Tool & Automatic Manufacturing Technique, Issue 01, Jan. 20, 2018, pp. 154-159 (abstract translated).

(Continued)

*Primary Examiner* — Talia F Crawley
(74) *Attorney, Agent, or Firm* — Pilloff Passino & Cosenza LLP; Rachel K. Pilloff; Sean A. Passino

(57) ABSTRACT

Disclosed an indexing method and an indexing system for tracking record of composite material production process and quality monitoring, including: obtaining recorded data in production and use processes of composite materials in turn, integrating recorded data in different production and use processes respectively, and adding index marks to products in the different production or use processes according to index information corresponding to integration results; wherein index marks are used for feeding back the recorded data; in addition to a first production process, the recorded data corresponding to any production or use process also comprise the recorded data of the production or use process integrated with previous time series; in a process of integrating the recorded data, if composite material production process comprises a plurality of production detection stations, classifying the recorded data according to a time corresponding to the detection processes of production detection stations, and integrating classification results.

8 Claims, 7 Drawing Sheets

(56) References Cited

FOREIGN PATENT DOCUMENTS

| CN | 112947154 A | * | 6/2021 | ............. B29C 70/30 |
| CN | 113119489 A | * | 7/2021 | ............. B29C 70/30 |
| JP | 2012047606 A | * | 3/2012 | ............. B29B 11/12 |
| WO | WO-2017007012 A1 | * | 1/2017 | ............. B29C 70/46 |

OTHER PUBLICATIONS

Notification to Grant Patent Right for Invention dated Dec. 6, 2023 from SIPO in Application No. 202310753222.X.
First Office action from SIPO dated Nov. 2, 2024 in Application No. 202310753222.X.
First Search Report from SIPO dated Oct. 31, 2023 in Application No. 202310753222.X.
Second Search Report from SIPO dated Nov. 29, 2023 in Application No. 202310753222.X.

* cited by examiner

INDEXING METHOD AND SYSTEM FOR TRACKING RECORD OF COMPOSITE MATERIAL PRODUCTION PROCESS AND QUALITY MONITORING

CROSS-REFERENCE TO RELATED APPLICATIONS

This application claims priority to Chinese Patent Application No. 202310753222.X, filed on Jun. 25, 2023, the contents of which are hereby incorporated by reference.

TECHNICAL FIELD

The application relates to the technical field of composite material preparation, and in particular to an indexing method and an indexing system for tracking record of composite material production process and quality monitoring.

BACKGROUND

As a material with high specific strength (the ratio of tensile strength to material density), composite materials are mainly used in aerospace vehicles. The existing aerospace composite material products are made of thermosetting resin and carbon fiber into prepreg, and then the prepreg is paved by layers and molded, and then cured to form composite material parts. After successful curing, the thermosetting resin hardens irreversibly, so every process of composite material parts is irreversible. Meanwhile, because of the errors in the products produced in each process, the composite material parts formed after curing the composite materials have defects under the accumulation of various errors in the products.

Composite material parts are composed of multi-layer materials, which have anisotropic characteristics, and the product performance may not be detected by nondestructive detecting methods. Composite material parts are made of multi-layer prepreg, and the product quality of each layer of prepreg will affect the product quality of prepreg, and the product quality of each layer of prepreg is controlled by the resin performance, fiber performance, uniformity and production process. The preparation of composite material parts needs the combination of resins, fibers and processed prepregs produced in batches and quantities at different times. Therefore, in order to ensure the controllability of product quality of composite products and reduce product defects, the production process and product quality of each process are necessary to be strictly controlled in the production process of composite materials. Meanwhile, because of the irreversibility in the preparation process of composite materials, the product quality of each process may only be detected in the final part state, so it is impossible to verify the quality of each production step only by a small amount, mainly to control the product processing process. In the existing technical means, the above production process of resin, fiber and prepreg only provides the production batch and time, and there is no comprehensive record or incomplete record of the production process. The records are only stored in the production equipment of each process and may not form comprehensive data, and it is difficult to distinguish the prepreg data per meter, so it is impossible to provide complete comprehensive and detailed production data.

SUMMARY

In order to solve the problems existing in the prior art, the application provides an indexing system for tracking record of composite material production process and quality monitoring, which is beneficial to quickly finding out the problem points when the product quality problems occur, and is also conducive to the analysis of the causes of product quality problems.

In order to achieve the above technical objectives, the present application provides the following technical scheme.

An indexing method for tracking record of composite material production process and quality monitoring, including:

obtaining recorded data in production and use processes of composite materials in turn, integrating the recorded data in different production and use processes respectively, and adding index marks to products in the different production or use processes according to index information corresponding to integration results; where the index marks are used for feeding back the recorded data;

where in addition to a first production process, the recorded data corresponding to any production or use process also include the recorded data of the production or use process integrated with previous time series;

in a process of integrating the recorded data, if the composite material production process includes detection processes of a plurality of production detection stations, classifying the recorded data according to a time corresponding to the detection processes of the production detection stations, and integrating classification results.

Optionally, the composite material production process includes a resin production process, a glue film production process and a prepreg production process.

Optionally, controlling the inkjet printer to add the index marks to products in the production or use process, where the index marks are QR (Quick Response) codes.

Optionally, integrating the recorded data of the resin production process includes:

collecting product information of raw materials of resins, and receiving raw material addition information uploaded by an automatic feeding system and operation and discharge information of a reaction kettle; and integrating and packaging the product information of raw materials and received information into the data blocks corresponding to the resin block information.

Optional, integrating the recorded data of the glue film production process includes:

receiving preset glue film product information uploaded by a glue film coating machine; searching data blocks corresponding to resin block information by scanning the index marks corresponding to resin blocks, obtaining the resin block information and obtaining resin adding information, in a production process of the glue film coating machine, receiving operation detection information of different stations of the glue film coating machine and performing a summarization, and classifying the operation detection information after the summarization according to a glue film reference time and a position of a station detection point;

receiving real-time gram weight detection data and a transverse length of an online gram weight detection system, and classifying the real-time gram weight detection data and the transverse length according to the glue film reference time and a position of the online gram weight detection system;

summarizing and packaging classification results, received and obtained information in the glue film production process into data blocks corresponding to glue film information.

Optionally, integrating the recorded data in the prepreg production process includes:

collecting fiber information and preset prepreg product information;

receiving index marks corresponding to glue film scanned by a probe, searching data blocks corresponding to the glue film information, obtaining the glue film information, and classifying the glue film information according to a prepreg reference time and a probe position;

receiving operation detection information of different stations of a composite prepreg machine, and classifying the glue film information according to the prepreg reference time and the position of the station detection point;

receiving the real-time gram weight detection data and the transverse length of the online gram weight detection system, and classifying the real-time gram weight detection data and the transverse length according to the glue film reference time and the position of the online gram weight detection system;

receiving real-time detection defect information and a defect transverse length from an appearance detection system, and classifying the real-time detection defect information and the transverse length according to the glue film reference time and a position of the appearance detection system; and summarizing and packaging the classification results, the fiber information and the preset prepreg product information in the prepreg production process into data blocks corresponding to prepreg information.

Optionally, integrating the recorded data during a prepreg use process includes:

collecting production information and batch number information of composite material parts;

receiving index marks corresponding to prepregs in two areas before and after paving the prepregs scanned by the probe, obtaining prepreg information in the two areas of front and rear and determining a number of paving layers;

according to the prepreg information of the two areas of front and rear, performing an integration to form paving layer data;

after the composite material parts are paved, collecting the prepreg information of each layer of the composite material parts, and integrating the prepreg information of each layer to generate integrated information and a material report of the composite material parts, where the material report includes index information or index marks corresponding to the integrated information.

Optionally, integrating the recorded data during the prepreg use process also includes:

recording relevant information of subsequent curing generation process of the composite material parts, receiving detection results of cured composite material parts with a part detection, and inputting the relevant information and the detection results into integrated data.

Optionally, the index marks adopt QR codes or Radio Frequency Identification (RFID) tags.

In order to better achieve the above technical objectives, the application also provides an indexing system for tracking record of composite material production process and quality monitoring, where the indexing system is used for executing the indexing method for tracking record of composite material production process and quality monitoring.

The application has the following technical effects.

The application provides an indexing system for tracking record of composite material production process and quality monitoring, which is a feedback system for monitoring the production process and product quality in the whole process from resin production→glue film production→prepreg production→prepreg use. The indexing system may form the whole process data integration processing, and form the product data file of each composite material part. Through the above scheme, the production data of each process is fragmented and detailed, and is transmitted along with the smallest unit material. When several minimum unit materials are combined for production, the fragmented data will be integrated to form new data packets, and finally the whole detailed detection data of finished parts will be formed. The application is beneficial to quickly searching and finding the problem point when the product quality problem occurs, and is also beneficial to analyzing the causes of the problem.

BRIEF DESCRIPTION OF THE DRAWINGS

In order to explain the embodiments of the present application or the technical scheme in the prior art more clearly, the drawings needed in the embodiments will be briefly introduced below. Obviously, the drawings in the following description are only some embodiments of the present application. For ordinary people in the field, other drawings may be obtained according to these drawings without paying creative labor.

DETAILED DESCRIPTION OF THE EMBODIMENTS

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative labor belong to the scope of protection of the present application.

According to the technical scheme of the application, the whole process of composite material production and the integrated records of the whole production data are indexed, and the detailed data of each layer of prepreg under each part in each process in the production process are generated in detail (the data is detailed to the accurate data under each unit length). Therefore, recording and feeding back the production process and detection parameters of the prepreg in each layer of composite material parts may monitor and detect the quality of composite material products, but the related methods and systems for detecting the quality of composite material products are not provided in the prior art.

Figure 7:
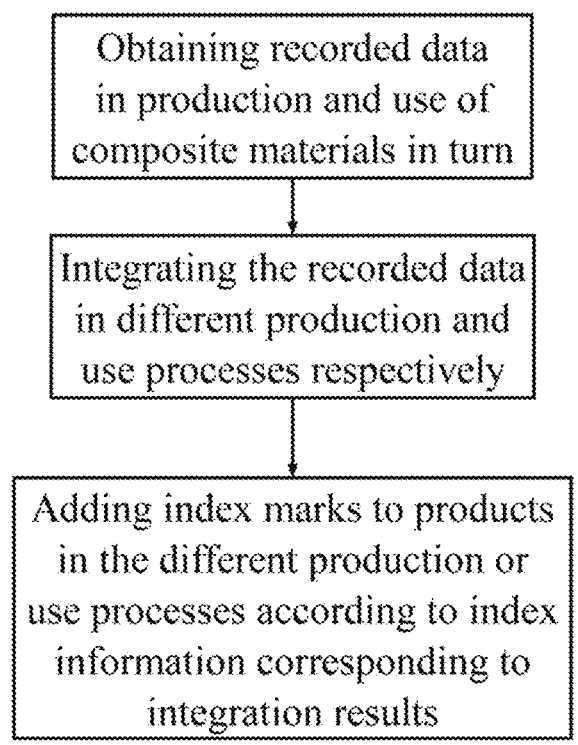
FIG. 7 is a schematic flow chart of the monitoring and tracking record indexing method provided by the embodiment of the present application.

In order to solve the problems existing in the prior art, as shown in FIG. 7, the present application provides the following scheme: an indexing method for tracking record of composite material production process and quality monitoring, including:

- obtaining recorded data in production and use processes of composite materials in turn, integrating the recorded data in different production and use processes respectively, and adding index marks to products in the different production or use processes according to index information corresponding to integration results; where the index marks are used for feeding back the recorded data;
- where in addition to a first production process, the recorded data corresponding to any production or use process also include the recorded data of the production or use process integrated with previous time series;
- in a process of integrating the recorded data, if the composite material production process includes detection processes of a plurality of production detection stations, classifying the recorded data according to a time corresponding to the detection processes of the production detection stations, and integrating classification results.

Figure 1:
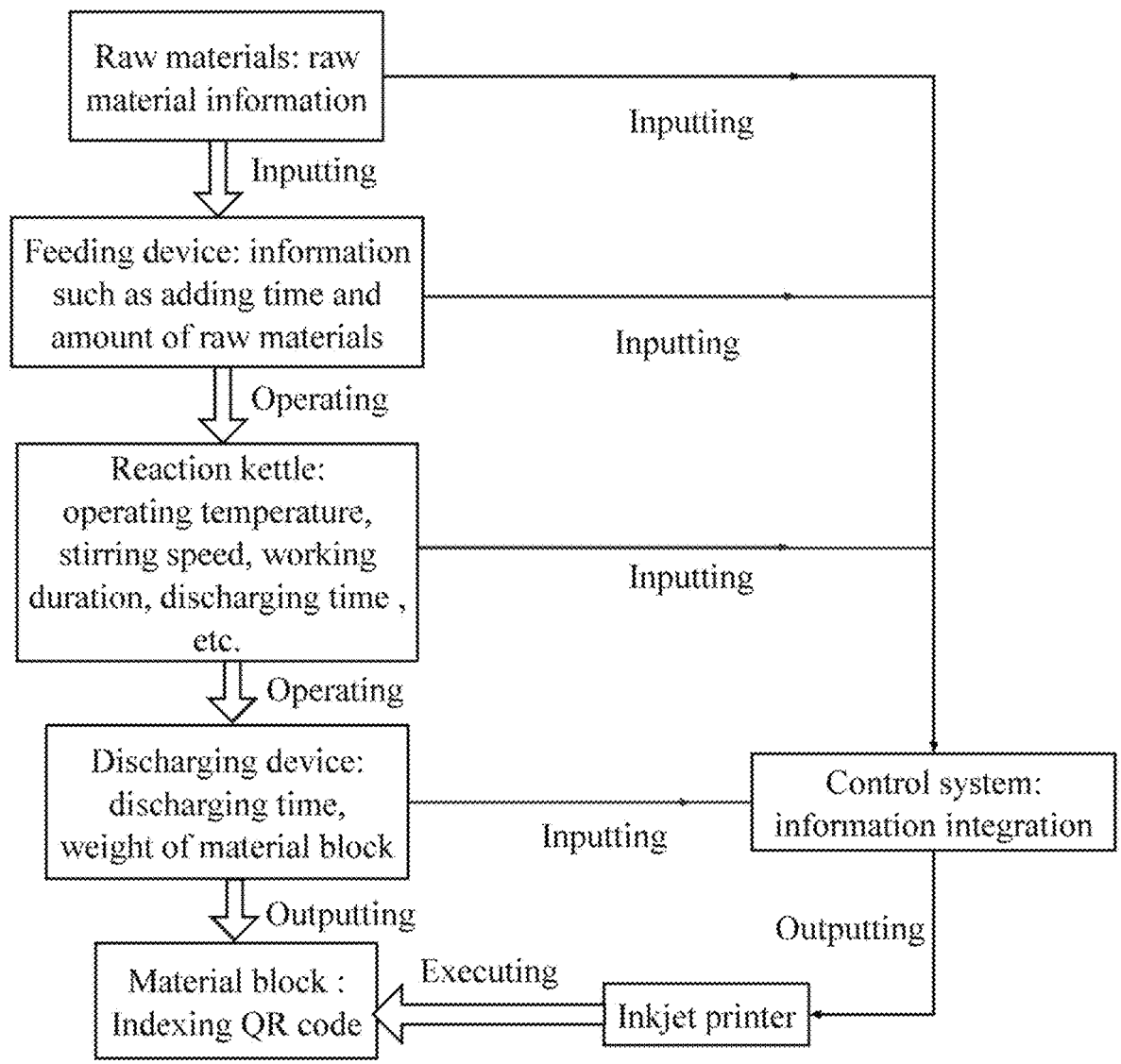
FIG. 1 is a schematic diagram of resin production monitoring provided by an embodiment of the present application.

The application describes an indexing method for tracking record of composite material production process and quality monitoring, which is combined with specific production and use processes of composite materials. The specific implementation methods are shown in FIG. 1, FIG. 2, FIG. 4 and FIG. 6:

1. Monitoring Record of Resin Production: (as Shown in FIG. 1)

Two-component raw material product information are input control system;
- the automatic feeding system uploads the information such as adding time and amount of two-component raw materials to the control system;
- the control system of the reaction kettle uploads information such as time information, operating temperature, stirring speed, working duration and discharging time to the control system.

The reaction kettle automatically discharges after resin production is completed. The control system packages the information of this block (discharging time and weight of the block) and the production process information of the reaction kettle to form a data block, and the control system uploads the index information of the data block to the inkjet printer to spray the index QR code information on the block packaging.

Figure 2:
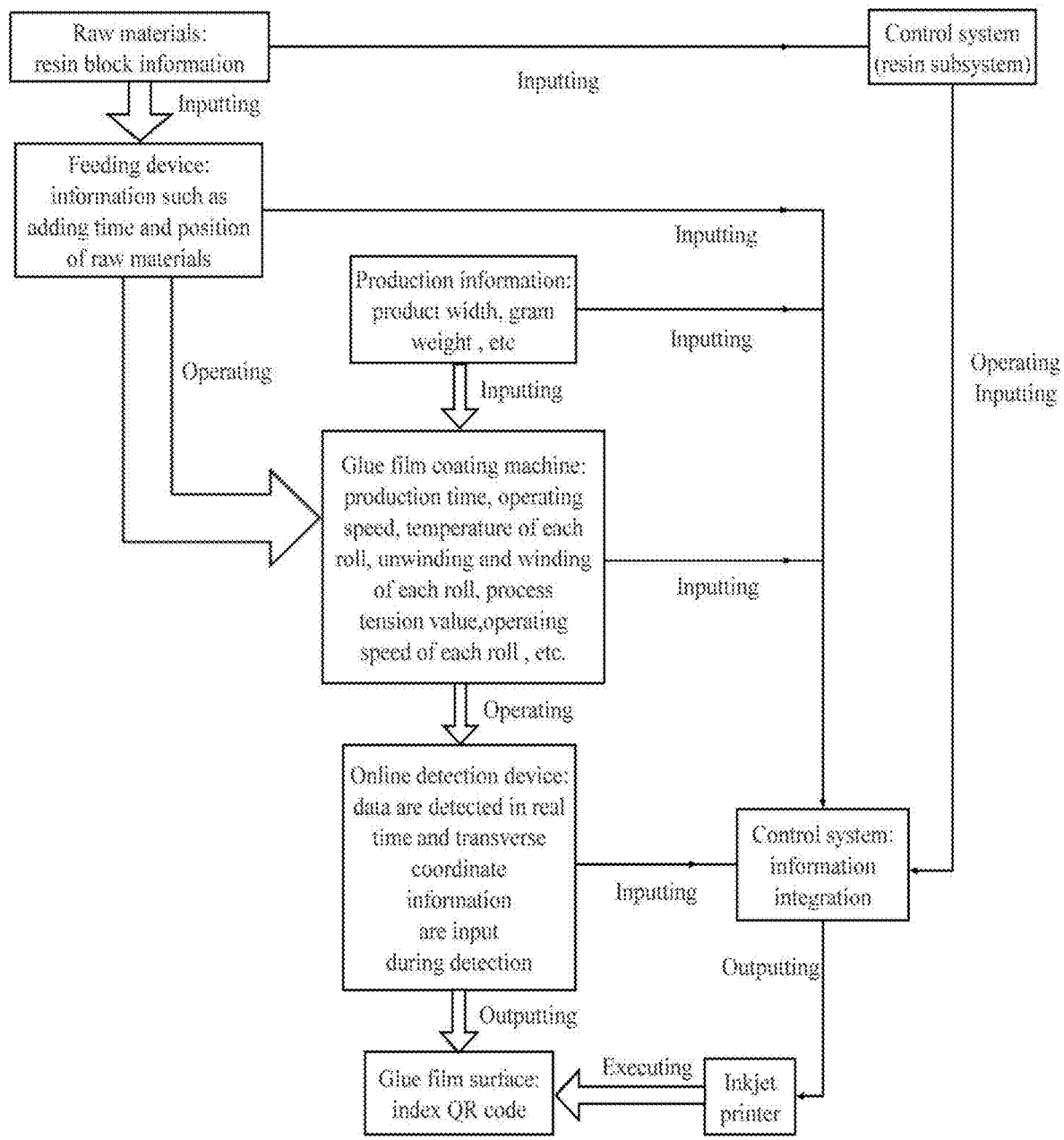
FIG. 2 is a schematic diagram of glue film production monitoring provided by an embodiment of the present application.

2. Monitoring Record of Glue Film Production: (as Shown in FIG. 2)
- the glue film coating machine uploads the information (product width, gram weight) of the produced products to the control system.

Figure 3:
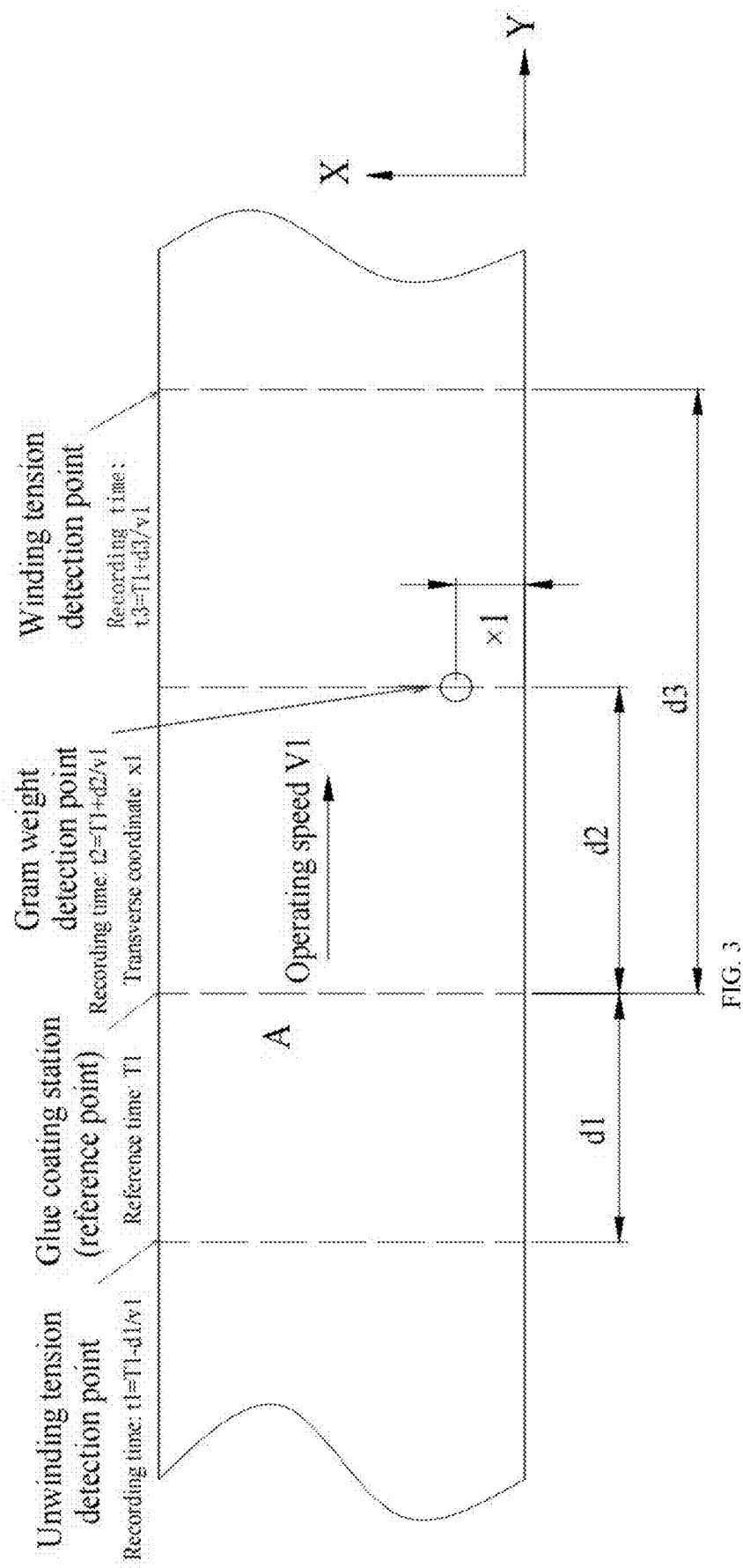
FIG. 3 is a schematic diagram of stations of glue film production monitoring provided by an embodiment of the present application.

When each resin block is added, scanning the QR code information is necessary, and the control system automatically records the information such as resin adding time and adding position according to the input information;

The production of the glue film coating machine is started, and the glue film coating machine system uploads information such as equipment production time, operating speed, temperature of each roller, gap value, unwinding, winding and process tension values and operating speed of each roller to the control system; the control system classifies the position of each station (the length d from the detection point to the glue coating station (reference point) and the operating speed (v1) according to the glue film reference time (T1), and then classifies the operation detection information according to the time when the reference point arrives at the detection point (i.e. T1±d/v1) (as shown in FIG. 3).

The online gram weight detection system uploads the real-time detection data and the transverse coordinate information during detection to the control system according to the reference time (i.e. T1±d/v1) and classifies the detection information (the length d between the detection point and the glue coating station (reference point)) (as shown in FIG. 3).

The control system summarizes, classifies and packages the resin information, operating speed, temperature, tension, detected gram weight information, transverse coordinates of detection points, adding time of resin blocks etc. at the glue film winding place according to the reference time. The control system transmits the data block index information to the inkjet printer, which sprays the index QR code information on the surface of the glue film release paper/plastic film at a set interval, and forms continuous QR code information with equal intervals on the glue film surface. After the production of each roll of glue film is completed, the control system controls the inkjet printer to spray the production information of the whole roll of glue film at the tail of the glue film roll.

Figure 4:
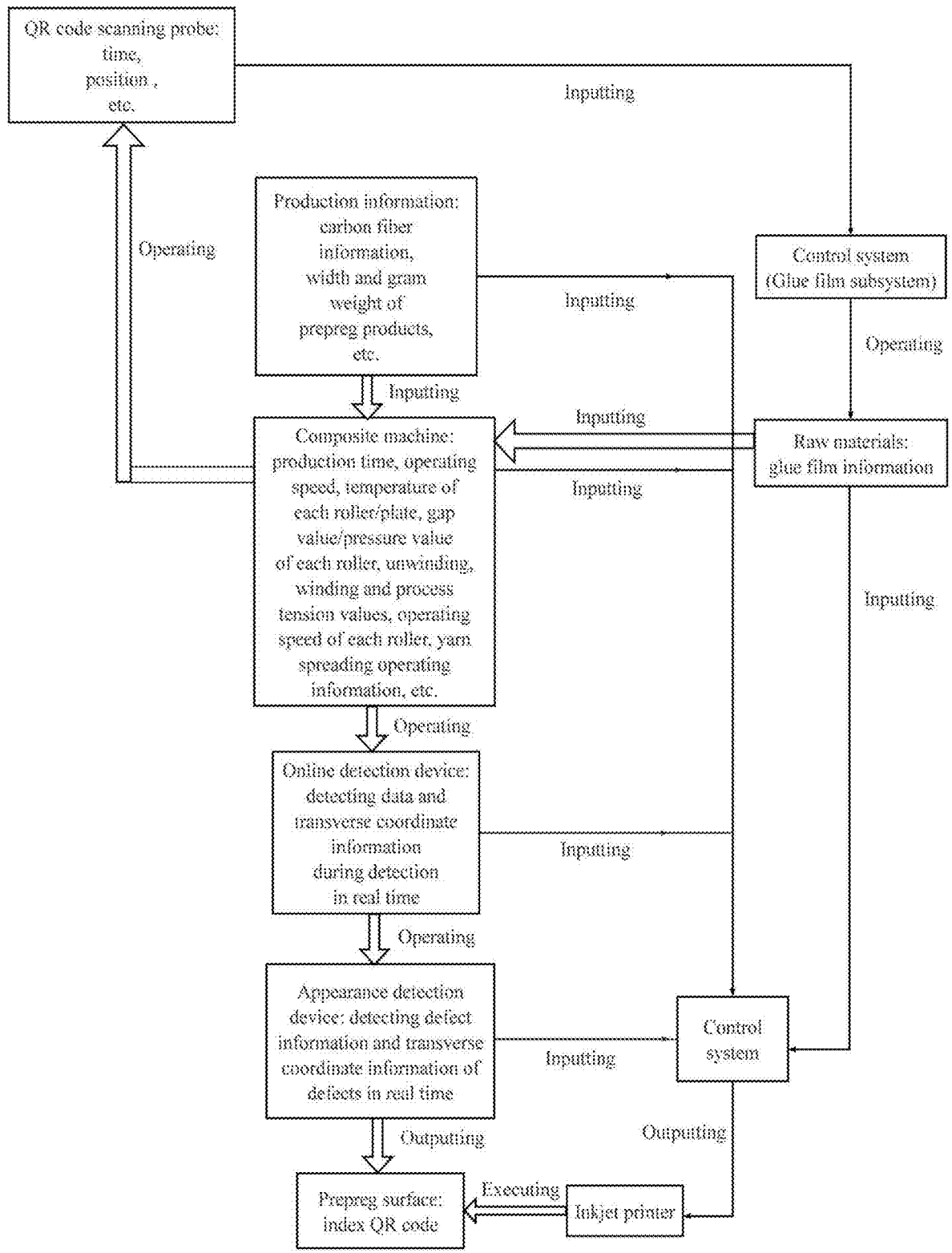
FIG. 4 is a schematic diagram of prepreg production monitoring provided by an embodiment of the present application.

3. Monitoring Record of Prepreg Production: (as Shown in FIG. 4)

Firstly, the parameters (product information, batch number, manufacturer, etc.) and quantity of producing prepreg carbon fiber or other fibers are input into the control system.

The product information (product width, gram weight, resin content, etc.) is uploaded to the control system.

Figure 5:
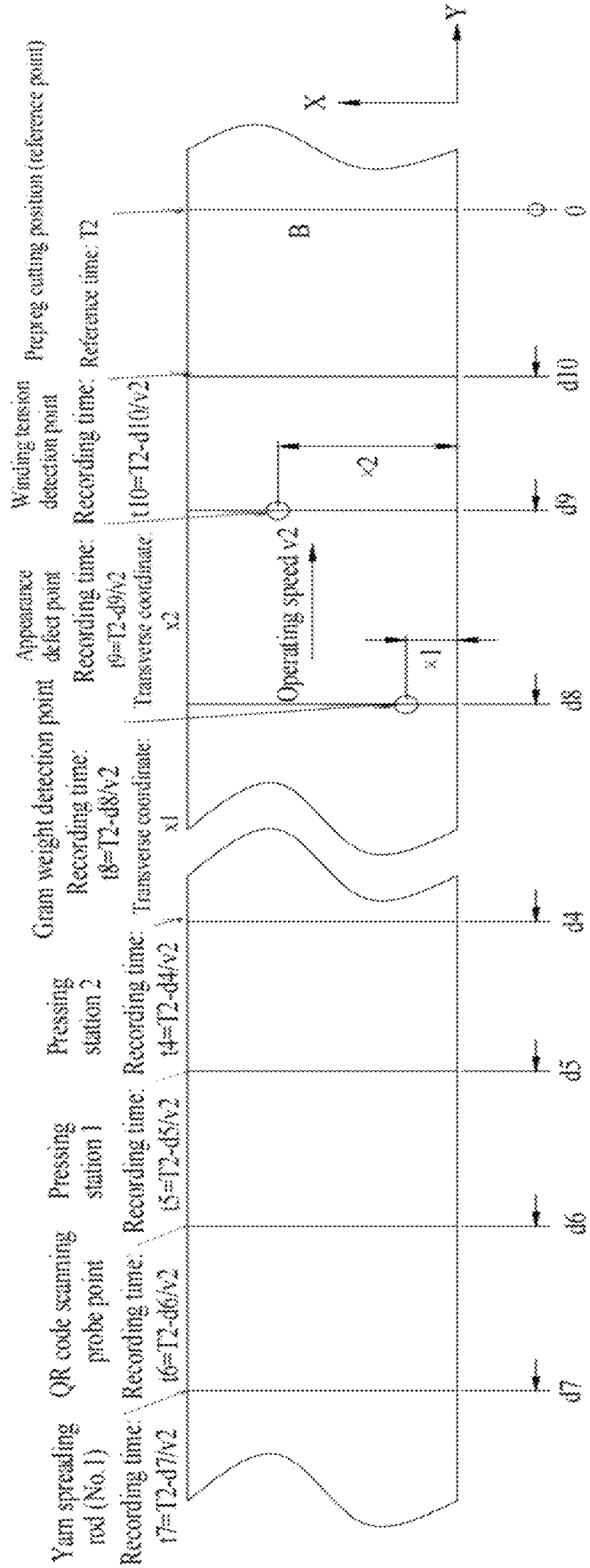
FIG. 5 is a schematic diagram of stations of prepreg production monitoring provided by an embodiment of the present application.

The upper glue film and the lower glue film are produced by starting the composite prepreg, the fibers are pressed and soaked under the action of a heating roller, and the QR code spray on the surface of the glue film is continuously scanned by a QR code scanning probe before the upper glue film and the lower glue film prepared by the glue film coating machine are pressed and soaked, and the resin and glue film production information of the glue film is indexed according to the QR code information. The control system archives the resin production information and the glue film production information of the glue film at the position of the QR code scanning probe according to the time information; (Example: at time T2, the classified information is the information of d6 position; the length between the QR code scanning probe and the prepreg cutting position (reference point) is d6; operating speed: v2; the time for the QR code scanning probe to obtain information is t6; T2=t6+d6/v2) (as shown in FIG. 5).

Meanwhile, the composite prepreg system uploads the production time, operating speed, temperature of each roller/plate, gap value/pressure value of each roller, unwinding, winding and process tension values, operating speed of each roller, yarn spreading operating information, etc. to the control system; the control system classifies and archives each operation detection information according to the time information; (Example: at time T2, the classified information is the information of d' position; the length from each operation detection information probe to the prepreg cutting position (reference point) is: d'; operating speed: v2; the time for each operation detection information probe to obtain information is: t'; T2=t'+d'/v2) (as shown in FIG. 5).

The control system classifies and archives the real-time detection data of the online gram weight detection system and the transverse coordinate information during detection according to the time information; (Example: at time T2, the classified information is the information of d8 position; the length from the probe of the online gram weight detection system to the prepreg cutting position (reference point) is d8; operating speed: v2; the time for the probe of online gram weight detection system to obtain information is: t8; T2=t8+d8/v2) (as shown in FIG. 5).

The control system classifies and archives the defect information detected by the appearance detection system in real time according to the time information; (Example: at time T2, the classified information is the information of d9 position; the length from the real-time detection probe of the appearance detection system to the prepreg cutting position (reference point) is: d9; operating speed: v2; the time for obtaining information from the real-time detection probe of the appearance detection system is: t9; T2=t9+d9/v2) (as shown in FIG. 5).

The control system summarizes, classifies and packages the prepreg information, operating speed, temperature, tension, detected gram weight (defect) information, transverse coordinates of detection point (defect) and information such as upper and lower glue film production and resin production of this section of prepreg according to the reference time. The control system transmits the data block index information to the inkjet printer, which sprays the index QR code information on the surface of prepreg release paper/plastic glue film at a set interval to form continuous QR code information with equal intervals on the surface of prepreg. After the production of each roll of prepreg is completed, the control system controls the inkjet printer to spray the production information of the whole roll of glue film at the tail of the prepreg roll.

Figure 6:
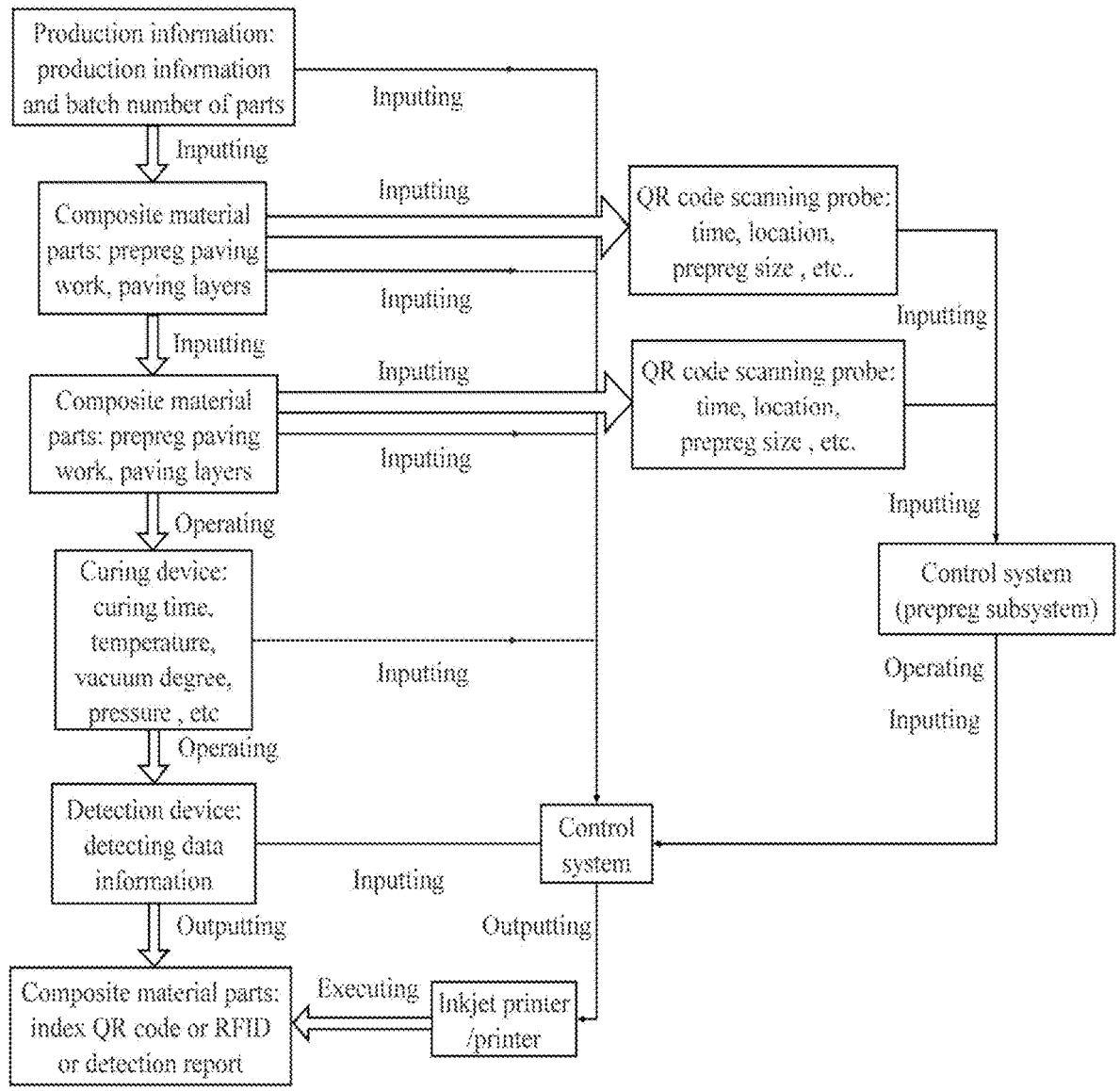
FIG. 6 is a schematic diagram of production monitoring of composite material parts provided by an embodiment of the present application.

4. Monitoring Record of Prepreg Use Process: (as Shown in FIG. 6)

In the production process of composite material parts, several layers of prepreg need to be paved. First, the production information and batch number of composite material parts are input into the control system. Before paving and cutting each layer of prepreg, a QR code scanning probe is used to scan the front and rear QR codes of this section of prepreg and confirm the number of paving layers in the control system. The control system automatically retrieves all prepreg data between the front and rear QR codes according to the two QR codes and summarizes and integrates the prepreg data into this layer of paving layer data. After the paving of composite material parts is completed, the control system may record the information of each layer of prepreg and generate an index information package, and issue a material report of composite material parts (including index information/QR code).

Meanwhile, the control system may access the relevant information of the subsequent curing production process of composite material parts, such as curing time, temperature, vacuum degree, pressure and so on. The curing equipment may write the batch number or QR code information of composite materials manually or automatically into the integrated data of each composite material part after being integrated by the control system.

After curing, composite material parts are detected (ultrasonic testing and CT scanning). The detection data may be manually or automatically entered into the composite lot number or QR code information, and then integrated by the control system and written into the integrated data of each composite material part.

When using composite material parts, the production information and detection information of each process of composite material parts may be queried according to the batch number of composite material parts or the index information/QR code in the report.

The control system integrates and packages the information of composite material parts using prepreg, which is convenient to follow the composite material parts out of the factory in the form of file package or detection report.

The QR code in the application may be replaced by other information transmission modes such as RFID according to the working conditions.

The reference point of the application may be adjusted according to the actual production experience.

The composite material parts of the application may be pasted or sprayed with index QR codes, and this operation is determined according to the product requirements.

According to the application, any variable point in the production process may be monitored in real time, the monitoring data may be fed back in real time, and the monitoring data may be summarized to the final product, and when the product quality appears at the cost, the real-time processing and production detection data of each process of the current part may be quickly retrieved.

According to the application, the production data of each process are fragmented and detailed, and are transmitted along with the minimum unit material. When several minimum unit materials are combined for production, the fragmented data will be integrated and form new data packets, and finally the overall detailed detection data of finished parts will be formed.

The application is beneficial to quickly searching and finding the problem point when the product quality problem occurs, and is also beneficial to analyzing the causes of the problem.

In view of the above technical scheme and related experimental data, the application provides the following embodiments:

Embodiment 1

1. Monitoring Record of Resin Production: (as Shown in FIG. 1)

Two-component raw material product information input control system;
the automatic feeding system inputs information such as adding time and adding amount of two-component raw materials into the control system;
in this embodiment, the adding time and amount of raw materials are recorded as follows: adding time: 1345:45 on Oct. 13, 2022, adding 10 kg of epoxy A component resin, 20 kg of B component resin, 1 kg of flame retardant and toughening particles and 100 g of catalyst;
the control system of the reaction kettle uploads the relevant information of the reaction kettle such as time information, operating temperature, stirring speed, working time and discharging time to the control system;
in this embodiment, the relevant data of the reaction kettle control system are recorded as follows: startup time information at 13:50:10 on Oct. 13, 2022, equipment startup, stirring speed at 40 r/min, reaction kettle temperature at 100° C., operating duration at 180 min, and discharging time at 16:50:10 on Oct. 13, 2022. The uploading interval may be determined according to manual experience. In this embodiment, the setting temperature and stirring speed information are uploaded once every minute.

The reaction kettle automatically discharges after resin production is completed, and the control system packages the information of the material block and the monitoring record data related to the production process of the reaction kettle to form a data block, and the control system transmits the index information of the data block to the inkjet printer to spray the index QR code information on the material block package.

In this embodiment, the information of this block includes the discharging time and the weight of the block, which are recorded as the discharging time of 16:50:10 on Oct. 13, 2022, and the discharging amount is 10 kg. The discharging time is 16:59:10 on Oct. 13, 2022, and the discharging amount is 10 kg; and the production process information of the reaction kettle is recorded as the startup time information at 13:50:10 on Oct. 13, 2022, the equipment startup and stirring speed is 40 r/min, the reaction kettle temperature is 100° C., and the operating duration is 180 min.

2. Monitoring Record of Film Production: (as Shown in FIG. 2)

the glue film coating machine inputs and uploads the production product information into the control system;

in this embodiment, the production product information includes product width and gram weight, which is recorded as product width of 1000 mm and production gram weight of 50 g/m2;

When each resin block is added, scanning the QR code information is necessary, the QR code information is generated in the resin production process, and the control system automatically records the information such as resin adding time and resin adding position according to the input information;

in this embodiment, the resin adding time is recorded as: the adding time is at 8:50:10 on Oct. 14, 2022; QR code information scanning: resin discharging time: 16:59:10 on Oct. 13, 2022, discharging amount is 10 kg, resin production information: at 13:50:10 on Oct. 13, 2022, the equipment startup and stirring speed is 40 r/min, the reaction kettle temperature is 100° C., and the operating duration is 180 min.

Production of the glue film coating machine is started, and the glue film coating machine system uploads information such as equipment production time, operating speed, temperature of each roller, gap value, unwinding, winding and process tension values and operating speed of each roller to the control system; the control system classifies and archives the information of the production time, operating speed, temperature of each roller, gap value, unwinding, winding and process tension value, operating speed of each roller and other information according to time information; (Example: at time T1, the classified information is the information of position d; the length from the detection point to the gluing station (reference point) is: d; operating speed: v1; the time for obtaining information such as equipment production time, operating speed, temperature of each roller, gap value, unwinding, winding and process tension value, operating speed of each roller, etc. is: t; $T=t\pm d/v1$) (as shown in FIG. 3).

In this embodiment, if the area A is located at the glue coating station (reference point) at the glue film reference time T1, the tension value detected at $t1=T1-d1/v1$ when the area A is operated to the unwinding tension detection point, where t1 is the time at the unwinding tension detection point, d1 is the distance from the unwinding tension detection point to the glue coating station, and v1 is the operating speed;

in this embodiment, the unwinding tension value is recorded as Fi=200 n; when the area A operates to the glue coating station, that is, the production time, operating speed, temperature of each roller and gap value at the glue film reference time T1, in this embodiment, the relevant recorded data of the glue coating station are as follows: the production time is 10:50:10 on Oct. 15, 2022, the operating speed v1=20 m/min, the glue coating roller is 90° C., the metering roller is 100° C. and the glue coating roller speed is 18 m/min, the rubber roller speed is 19 m/min, and the gap value is 0.023 mm. When the area A operates to the winding tension detection point, that is, the tension value of $T3=T1+d3/v1$, the winding tension value is recorded as 300n in this embodiment.

The control system classifies and archives the real-time detection data of the online gram weight detection system and the transverse coordinate information during detection according to the time information; (Example: at time T1, the classified information is the information of d2 position; the length from the probe of the online gram weight detection system to the gluing station (reference point) is d2; operating speed: v1; the time for the probe of online gram weight detection system to obtain information is: t; $T1=t2-d2/v1$) (as shown in FIG. 3), where t3 is the time at the winding tension detection point and d3 is the distance from the winding tension detection point to the glue coating station;

in this embodiment, when the area A operates to the position of the gram weight detection point, that is, the gram weight and the X coordinate position at the time of $t2=T1+d2/v1$, where t2 is the time at the gram weight detection point and d1 is the distance from the gram weight detection point to the glue coating station; this embodiment is recorded as: gram weight: 51 g/m$^2$, and X coordinate is 300 mm.

The control system summarizes, classifies and packages the prepreg information, operating speed, temperature, tension, detected gram weight information, transverse coordinates of detection point, adding time of resin blocks, etc. at the glue film winding place according to the reference time. The control system transmits the data block index information to the inkjet printer, and the inkjet printer sprays the index QR code information on the surface of the glue film release paper/plastic film at a set interval to form continuous QR code information with equal intervals on the surface of the glue film. After the production of each roll of glue film is completed, the control system controls the inkjet printer to spray the production information of the whole roll of glue film at the tail of the glue film roll. In this process, the data of different areas of the glue film are recorded, and the different areas may be set according to each meter, so that the production information of each meter of glue film may be queried and indexed.

In this embodiment, the QR code information of area A edge index corresponding to the glue film production process record is recorded as: resin information: adding time: 8:50:10 on Oct. 14, 2022; discharge time of resin: 16:59:10 on Oct. 13, 2022, the discharging amount is 10 kg, production information of resin: 13:50:10 on Oct. 13, 2022, the equipment startup and stirring speed is 40 r/min, the reaction kettle temperature is 100° C., and the operating duration is 180 min; information of resin film: width is 1000 mm, production gram weight is 50 g/m², operating information: at 10:50:10 on Oct. 15, 2022, the operating speed v1=20 m/min, the glue coating roller is 90° C., the metering roller is 100° C. and the glue coating roller speed is 18 m/min, the rubber roller speed is 19 m/min, and the gap value is 0.023 mm, the unwinding tension 200 n, the winding tension 300 n, and the detected gram weight is 51 g/m², and X coordinate is 300 mm.

3. Monitoring Record of Prepreg Production: (as Shown in FIG. 4)

Firstly, the parameters and quantity of producing prepreg carbon fiber or other fibers are input into the control system.

In this embodiment, the fiber parameters include product information, batch number, manufacturer, etc. The above data are recorded as product information T700-12k, batch number 2022030910345, the type of expanded fiber and the number is 300 spindles;

the production product information is input and uploaded into the control system;

in this embodiment, the product information includes product width, gram weight, resin content, etc. The above data are recorded as: width 1000 mm, gram weight of fiber 240 g/m², resin content: 29.4%.

The upper glue film and the lower glue film are produced by starting the composite prepreg, the fibers are pressed and soaked under the action of a heating roller, and the QR code spray on the surface of the glue film is continuously scanned by a QR code scanning probe before the upper glue film and the lower glue film prepared by the glue film coating machine are pressed and soaked, and the resin and glue film production information of the glue film is indexed according to the QR code information. The control system archives the resin production information and the glue film production information of the glue film at the position of the QR code scanning probe according to the time information; (Example: at time T2, the classified information is the information of d6 position; the length between the QR code scanning probe and the prepreg cutting position (reference point) is d6; operating speed: v2; the time for the QR code scanning probe to obtain information is t6; T2=t6+d6/v2) (as shown in FIG. 5), where t6 is the time of the QR code scanning the probe;

in this embodiment, if the prepreg area B is located at the prepreg cutting position (reference point) at time T, when the area B operates to the position of the QR code scanning probe, the QR code at the edge of the glue film A area, that is, the QR code generated in the glue film production process, is detected by the QR code scanning probe, that is, the glue film information detected at time t6=T2−d6/v2; in this embodiment, the recorded data of QR code detection scanned by the QR code scanning probe are: resin information: adding time: at 8:50:10 on Oct. 14, 2022; discharging time of resin: at 16:59:10 on Oct. 13, 2022, discharging amount is 10 kg, production information of resin: at 13:50:10 on Oct. 13, 2022 on Oct. 13, 2022, the equipment startup and stirring speed is 40 r/min, the reaction kettle temperature is 100° C., and the operating duration is 180 min; information of resin film: width is 1000 mm, production gram weight is 50 g/m²; operating information: at 10:50:10 on Oct. 15, 2022, the operating speed v1=20 m/min, the glue coating roller is 90° C., the metering roller is 100° C. and the glue coating roller speed is 18 m/min, the rubber roller speed is 19 m/min, and the gap value is 0.023 mm, unwinding tension F=200 n, winding tension F=300 n, and the detected gram weight is 51 g/m², and X coordinate is 300 mm.

Meanwhile, the composite prepreg system uploads the equipment production time, operating speed, temperature of each roller/plate, gap value/pressure value of each roller, unwinding, winding and process tension values, operating speed of each roller, yarn spreading operating information, etc. to the control system; the control system classifies and archives each operation detection information according to the time information; (Example: at time T2, the classified information is the information of d' position; the length from each operation detection information probe to the prepreg cutting position (reference point) is: d'; operating speed: v2; the time for each operation detection information probe to obtain information is: t'; T2=t'+d'/v2) (as shown in FIG. 5);

where t7, t5, t4 and t10 are respectively the time at the yarn spreading rod, the pressing station 1 and the pressing station 2 and the time at the winding tension detection point, d7, d5, d4 and d10 are respectively the time at the yarn spreading rod, the pressing station 1 and the pressing station 2, and the distance between the winding tension detection point and the glue coating station;

in this embodiment, that is, the area B is at each of the positions, and the positions includes the yarn spreading rod, the stitching station 1, the stitching station 2, and the winding tension detection point, and the feedback information is detected at each position. In this embodiment, the above data are recorded as: the equipment production time is 10:50:10 on Oct. 15, 2022, the main engine speed v2=6 m/min, the yarn spreading rod temperature is 100° C., the temperature of pressing station 1 is 101° C. and the speed is 6 m/min, the temperature of pressing station 2 is 104° C. and the speed is 6 m/min, and the winding tension F=300 n.

The control system classifies and archives the real-time detection data of the online gram weight detection system and the transverse coordinate information during detection according to the time information; (Example: at time T2, the classified information is the information of d8 position; the length from the probe of the online gram weight detection system to the prepreg cutting position (reference point) is d8; operating speed: v2; the time for the probe of online gram weight detection system to obtain information is: t8; T2=t8+d8/v2) (as shown in FIG. 5), where t8 is the time when the composite prepreg system is located in the online gram weight detection system;

in this embodiment, when the area B operates to the position of the gram weight detection point, that is, the gram weight detected and the position of the X coordinate at the time t8=T2-d8/v2, this embodiment records the above data: the detected gram weight is 342 g/m², and the X coordinate is 300 mm.

The control system classifies and archives the defect information detected by the appearance detection system in real time according to the time information; (Example: at time T2, the classified information is the information of d9 position; the length from the real-time detection probe of the appearance detection system to the prepreg cutting position (reference point) is: d9; operating speed: v2; the time for obtaining information from the real-time detection probe of the appearance detection system is: t9; T2=t9+d9/v2), where t9 is the time at the appearance defect detection point;

in this embodiment, when the area B operates to the position of the appearance defect detection point, that is, the defect and the X2 coordinate position detected at time t=t2−d9/v2, this embodiment records the above data: defect: hairball, with the X coordinate of 400 mm.

The control system summarizes, classifies and packages the prepreg information, operating speed, temperature, tension, detected gram weight (defect) information, transverse coordinates of detection point (defect) and information such as upper and lower glue film production and resin production of this section of prepreg according to the reference time. The control system transmits the data block index information to the inkjet printer, which sprays the index QR code information on the surface of prepreg release paper/plastic glue film at a set interval to form continuous QR code information with equal intervals on the surface of prepreg.

In this embodiment, the QR code information of the edge of area B corresponding to the prepreg production record is recorded as follows: prepreg information: T700−12k, 2022030910345, expanded fiber, 300 spindles, width of 1000 mm, fiber gram weight of 240 g/m$^2$, and resin content of 29.4%;

Coating information: resin information: adding time: at 8:50:10 on Oct. 14, 2022; discharging time of resin: at 16:59:10 on Oct. 13, 2022, discharging amount is 10 kg, resin production information: at 13:50:10 on Oct. 13, 2022, the equipment startup and stirring speed is 40 r/min, the reaction kettle temperature is 100° C., and the operating duration is 180 min; information of resin film: width is 1000 mm, production gram weight is 50 g/m$^2$; operating information: at 10:50:10 on Oct. 15, 2022, v1=20 m/min, the glue coating roller is 90° C., the metering roller is 100° C. and the glue coating roller speed is 18 m/min, the rubber roller speed is 19 m/min, and the gap value is 0.023 mm, unwinding tension is 200 n, winding tension is 300 m, and the detected gram weight is 51 g/m$^2$, and X coordinate is 300 mm.

Lower glue film information: resin information: adding time: 10:50:10 on Oct. 14, 2022; discharging time of resin: at 17:59:10 on Oct. 13, 2022, discharging amount is 10 kg, resin production information: at 13:50:10 on Oct. 13, 2022, the equipment startup and stirring speed is 40 r/min, the reaction kettle temperature is 100° C., and the operating duration is 180 min; information of resin film: width is 1000 mm, production gram weight is 50 g/m$^2$; operating information: at 10:50:10 on Oct. 15, 2022, v1=20 m/min, the glue coating roller is 90° C., the metering roller is 100° C. and the glue coating roller speed is 18 m/min, the rubber roller speed is 19 m/min, and the gap value is 0.023 mm, unwinding tension is 200 n, winding tension is 300 m, and the detected gram weight is 51 g/m$^2$, and X coordinate is 600 mm.

Operating information of prepreg: at 10:50:10 on Oct. 15, 2022, main machine speed v2=6 m/min, the yarn spreading rod temperature is 100° C., the temperature of pressing station 1 is 101° C. and the speed is 6 m/min, the temperature of pressing station 2 is 104° C. and the speed is 6 m/min, and the winding tension F=300 n. Detection gram weight: 342 g/m$^2$, X coordinate is 300 mm, defect: hairball, with the X coordinate of 400 mm.

On the surface of prepreg, continuous QR code information with equal intervals is formed according to different detection areas, and the information query of prepreg per meter is realized. After the production of each roll of prepreg is completed, the control system controls the inkjet printer to spray the production information of the whole roll of glue film at the tail of the glue film roll.

4. Monitoring Record of Prepreg Use Process: (as Shown in FIG. 6)

In the production process of composite material parts, several layers of prepreg need to be paved. First, the production information and batch number of composite material parts are input into the control system. Before paving and cutting each layer of prepreg, a QR code scanning probe is used to scan the front and rear QR codes of this section of prepreg. In this embodiment, this section is set as the prepreg area C, and the front and rear QR codes are the two QR codes corresponding to the prepreg area B and the area D 2 meters behind the prepreg area B, and the number of paving layers is confirmed in the control system. According to the front and rear QR codes, the control system automatically retrieves all the prepreg data between the front QR code, namely area B, and the rear QR code, namely area C, and summarizes and integrates all the prepreg data into paving layer data of this layer (i.e. integrating the information of area B, area C and area D). When the composite material parts are paved, the control system may record the information of each layer of prepreg and generate an index information package, and issue a material report of the composite material parts, that is, a material report summarizing all the information contained in the information of area B, area C and area D by meter and by layer (including index information/QR code).

Meanwhile, the control system may access the relevant information of the subsequent curing production process of composite material parts, such as curing time, temperature, vacuum degree, pressure and so on. The curing equipment may write the batch number or QR code information of composite materials manually or automatically into the integrated data of each composite material part after being integrated by the control system.

In this embodiment, the relevant information is recorded as: curing time: 12 h, temperature: 230° C., vacuum degree: 1200 pa, pressure: 4 MPa.

After curing, composite material parts are detected, including ultrasonic testing and CT scanning. The detection data may be manually or automatically input such as the batch number or QR code information of composite materials. The formats of the recorded data in the QR code are data, standard detection report PDF or figures, which are integrated by the control system and written into the integrated data of each composite material part respectively.

When using composite material parts, the production information and detection information of each process of composite material parts may be queried according to the batch number of composite material parts or the index information/QR code in the report.

In some embodiments, the control system integrates and packages the information of composite material parts using prepreg, which is convenient to follow the composite material parts out of the factory in the form of file package or detection report. If customers cannot access this control indexing system, delivery can be followed in the form of files such as U disk. If customers are available to this control indexing system, the QR code may be used to log in to the system to query the above production process information of all processes from resin to finished products.

In some embodiments, the QR code in the application may be replaced by other information transmission modes such as RFID according to the working conditions.

In some embodiments, the reference point of the application may be adjusted according to actual production experience.

In some embodiments, an index QR code may be pasted or sprayed on the composite material parts of the application, and this operation is determined according to the product requirements.

According to the application, any variable point in the production process may be monitored in real time, the monitoring data may be fed back in real time, and the monitoring data may be summarized to the final product, and when the product quality appears at the cost, the real-time processing and production detection data of each process of the current part may be quickly retrieved.

According to the application, the production data of each process are fragmented and detailed, and are transmitted along with the minimum unit material. When several minimum unit materials are combined for production, the fragmented data will be integrated and form new data packets, and finally the overall detailed detection data of finished parts will be formed.

In order to better achieve the above technical objectives, the application also provides an indexing system for tracking record of composite material production process and quality monitoring, and the indexing system is used for executing the indexing method for tracking record of composite material production process and quality monitoring.

The application is beneficial to quickly searching and finding the problem point when the quality problem of the outgoing product is, and is also beneficial to analyzing the causes of the problem. When the product has quality problems, the real-time production process information of this part may be found according to the QR code, and the quick query may be made according to the data information. In this process, because the information is simplified, the production information of this part is omitted, and the manual query and extraction process from the whole volume of data is omitted.

The above is only the preferred embodiment of this application, but the protection scope of this application is not limited to this. Any change or replacement that may be easily thought of by a person familiar with this technical field within the technical scope disclosed in this application should be included in the protection scope of this application. Therefore, the protection scope of this application should be based on the protection scope of the claims.

What is claimed is:

1. An indexing system for tracking records of composite material production process and quality monitoring, comprising:
a control system; an online gram weight detection system; an appearance detection system; a station detection point; a scanning probe; an inkjet printer; and a feedback system; wherein the composite material production process comprise: a resin production process, a glue film production process, and a prepreg production process; wherein integration of recorded data of the glue film production process comprises at least the steps of: receiving preset glue film product information uploaded by a glue film coating machine, wherein the glue film coating machine system uploads information including at least equipment production time, operating speed, temperature of each roller, gap value, unwinding, winding and process tension values and operating speed of each roller to the control system;
classifying the position of each of a plurality of glue coating stations and detection data by the control system, according to a reference point arrival time at the station detection point; the gram weigh detection system uploading and classifying the real time detection data and transverse coordinate data during detection to the control system, according to a reference time; and the control system summarizing, classifying, and packaging index information consisting of at least: resin information, operating speed, temperature, tension, detected gram weight information, and transverse coordinate information of the station detection points into data block index information; the control system converting the data block index information into index marks consisting of scannable QR code, and transmitting the data block index marks to the inkjet printer, wherein the inkjet printer sprays QR code index marks onto a surface of a glue film at a set interval and forms continuous QR code information with equal intervals on the glue film surface; wherein the control system controls the inkjet printer to spray integrated production information of the entire roll of glue film at a tail end of the glue film roll in the form of a QR code index mark; searching data blocks corresponding to resin block information by scanning, by the scanning probe, index marks corresponding to resin blocks, obtaining, by the scanning probe, the resin block information, and obtaining, by the scanning probe, resin adding information, in a production process of the glue film coating machine, receiving, by the control system, operation detection information of different stations of the glue film coating machine; archiving, by the control system, resin production information and glue film production information at the position of the scanning probe according to time information; detecting, by the appearance detection system, defect information, and transmitting, by the appearance detection system, the defect information to the control system; classifying, and archiving the defect information; and
automatically retrieving, by the control system, all index information between front and rear QR codes; confirming, using the front and rear QR codes, a number of paving layers; and retrieving, by the control system, all index information between the front and rear QR codes by scanning the front and rear QR codes, and integrating the combined index information into at least one layer of a plurality of layers of paving layer data; transmitting, to the control device, fragmented and detailed production data of each process, along with the minimum unit material, combining, along the production line, several minimum unit materials to form a finished product; integrating fragmented data, by the control system, to form new data blocks; and forming, by the control system, overall detailed detection data of the finished data, into a data block.

2. The indexing system for the tracking record of the composite material production process and the quality monitoring according to claim 1, further comprising: controlling, by the control system, an inkjet printer to add the index marks to the products in the production or use processes, wherein the index marks are Quick Response codes.

3. The indexing system for the tracking record of the composite material production process and the quality monitoring according to claim 1, wherein: integrating the recorded data of the resin production process comprises: collecting product information of raw materials of resins, and receiving raw material addition information uploaded by an automatic feeding system and operation and discharge information of a reaction kettle; and integrating and packaging the product information of the raw materials and received information, by the control system, into the data blocks corresponding to the resin block information.

4. The indexing system for the tracking record of the composite material production process and the quality monitoring according to claim 1, wherein:
integrating recorded data in the prepreg production process comprises: collecting fiber information and preset prepreg product information; receiving index marks corresponding to glue film scanned by the scanning probe, searching, by the control system, data blocks corresponding to the glue film information, obtaining, by the control system, the glue film information, and classifying, by the control system, the glue film information according to a prepreg reference time and a probe position; receiving, by the control system, operation detection information of different stations of a composite prepreg machine, and classifying, by the control system, the glue film information according to the prepreg reference time and the position of the station detection point; receiving, by the control system, the real-time gram weight detection data and the transverse length of the online gram weight detection system, and classifying, by the control system, the real-time gram weight detection data and the transverse length according to the glue film reference time and the position of the online gram weight detection system; receiving real-time detection defect information and a defect transverse length from the appearance detection system, and classifying, by the control system, the real-time detection defect information and the transverse length according to the glue film reference time and a position of the appearance detection system; and summarizing and packaging, by the control system, the classification results, the fiber information and the preset prepreg product information in the prepreg production process into data blocks corresponding to prepreg information.

5. The indexing system for the tracking record of the composite material production process and the quality monitoring according to claim 1, wherein:
integrating recorded data during a prepreg use process comprises: collecting production information and batch number information of composite material parts; receiving index marks comprising QR code corresponding to prepregs in two areas before and after paving the prepregs scanned by the scanning probe, obtaining, by the control system, prepreg information in the two areas of front and rear and determining, by the control system, a number of paving layers;
according to the prepreg information of the two areas of front and rear, performing, by the control system, an integration to form paving layer data; and after the composite material parts are paved, collecting, by the control system, prepreg information of each layer of the composite material parts, and integrating the prepreg information of each layer to generate integrated information and a material report of the composite material parts, wherein the material report comprises index information or index marks corresponding to the integrated information.

6. The indexing system for the tracking record of the composite material production process and the quality monitoring according to claim 1, wherein:
integrating the recorded data during the prepreg use process also comprises: recording, by the control system, relevant information of a subsequent curing generation process of the composite material parts, receiving, by the control system, detection results of cured composite material parts with part detection, and inputting, by the control system, the relevant information and the detection results into integrated data.

7. The indexing system for the tracking record of the composite material production process and the quality monitoring according to claim 1, wherein: the index marks adopt Quick Response codes or RFID tags.

8. An indexing method for tracking record of composite material production process and quality monitoring, wherein the indexing method is used for executing the indexing system for tracking records of composite material production processes and quality monitoring according to claim 1.

* * * * *